April 22, 1930.                H. A. SEARLE                1,755,901
                              FUMIGATING DEVICE
                             Filed Jan. 14, 1929
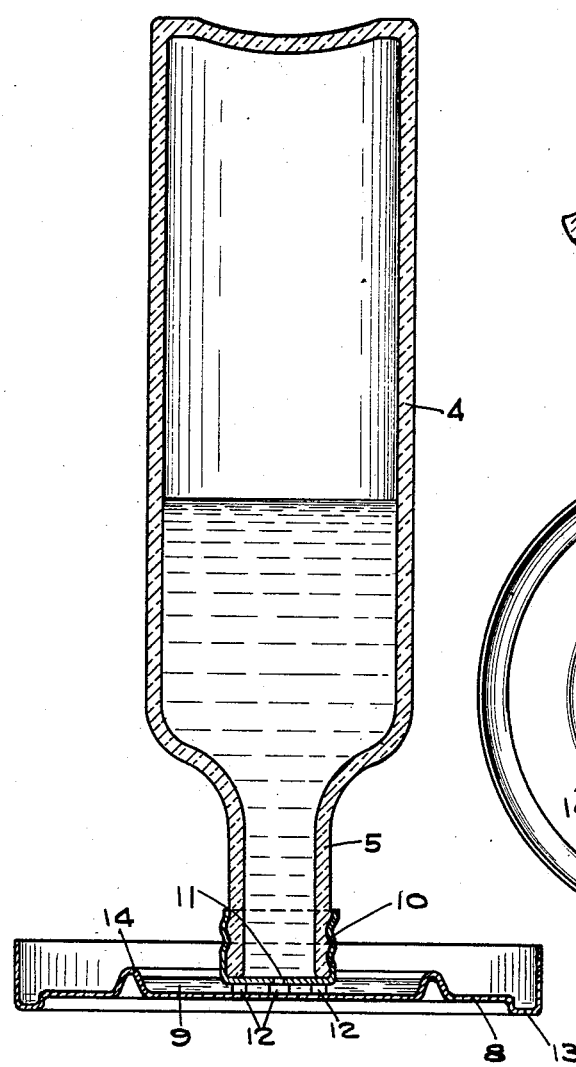
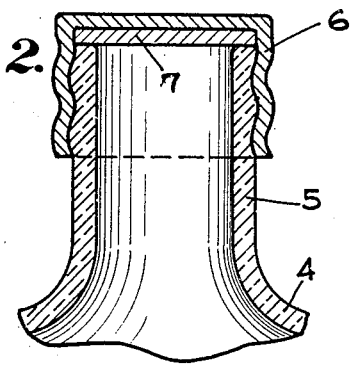
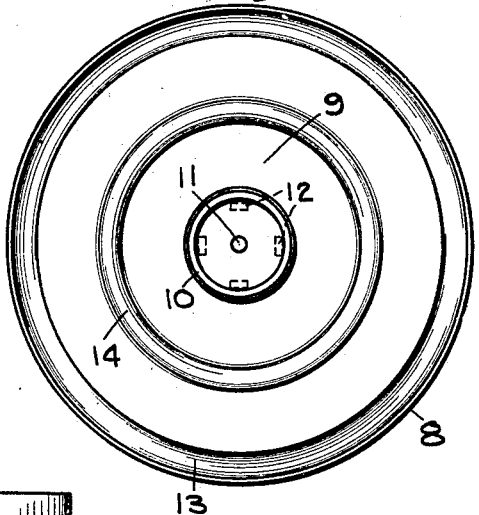
Inventor
H. A. Searle
By Hiram A. Sturges
Attorney Patented Apr. 22, 1930

1,755,901

UNITED STATES PATENT OFFICE

HARRY A. SEARLE, OF COUNCIL BLUFFS, IOWA

FUMIGATING DEVICE

Application filed January 14, 1929. Serial No. 332,317.

This invention relates to a device for dispensing liquids, and more particularly for dispensing Mothene and other liquid preparations for exterminating moths or preventing their destructive action upon clothing, furs and various kinds of fabrics, these liquids being volatile, and, when exposed to the atmosphere, operating to dispense fumes for these purposes.

One of the objects of the invention is to provide a fumigating device consisting of detached parts so that it may be shipped or retailed as a sales package and may be readily assembled ready for use by a purchaser.

Another object is to provide a fumigating device of such construction that the sales package mentioned may include a receptacle containing a liquid preparation securely sealed to prevent leakage and which may be assembled with other parts of the device when used.

The invention includes means for automatically dispensing the liquid to provide the fumes mentioned, and includes other objects which will be more particularly explained, and with these objects in view the invention presents a new and useful construction, combination and arrangement of parts as described and claimed and as illustrated in the accompanying drawing, it being understood that changes may be made in form, size and proportion of parts as may be found to be of advantage, said changes being within the scope of the invention as claimed.

In the drawing, Fig. 1 is a view showing the device in longitudinal section, the liquid receptacle being attached to the socket in the dispensing-pan and the parts being inverted.

Fig. 2 is a broken away view showing the neck of the liquid receptacle and screw-cap thereon.

Fig. 3 is a plan view of the base and dispensing-pan and its threaded socket.

Referring now to the drawing for a more particular description, numeral 4 indicates a receptacle provided with an exteriorly threaded neck portion 5, and as shown in Fig. 2 of the drawing, when the screw-cap 6 and disc 7 are applied to the neck of the receptacle no leakage of its liquid contents may occur.

Numeral 8 indicates a base support including a pan 9, which is provided centrally with an interiorly threaded socket or cup 10 having its bottom provided with a discharge port 11, the bottom of this socket being disposed somewhat above the bottom of the pan and connected therewith by any suitable means, lugs 12 being shown for this purpose.

As thus described when the parts are disposed as shown in Fig. 1 of the drawing, a liquid may flow from the receptacle 4 through the port 11 and may enter the pan by moving through said port and moving between the bottom of the socket and bottom of the pan, and in operation a liquid will continue to move into the pan until the space between the bottom of the socket and bottom of the pan is filled, and will thereafter cease any movement into the pan for the reason that the liquid therein operates as a seal to prevent air from entering the receptacle 4 through the aperture or port 11.

The construction shown proves to be of great advantage since the receptacle 4 may be filled with liquid and, together with the base 8, the pan and socket may be shipped or retailed to a purchaser as a package or in a carton (not shown), this being of commercial advantage since it is conducive to economy in manufacture and convenience to the user.

In operation, after the cap 6 has been removed, the base is secured to the receptacle, said base being rotated until the threads of the socket register with the threads of the neck 5. The device is then inverted and may be placed upon the floor or on a shelf of a room or closet for excluding moths therefrom or for exterminating moths. It will be understood that liquid in the pan will be gradually decreased since it will be exposed to the air and that liquid will move gradually from the receptacle into the pan, and that this operation will continue until all of the liquid has been drained from the receptacle.

In order that the supply of liquid in the pan may be uniform it, of course, is necessary that the neck of the receptacle should fit snugly in the socket, and the threaded connection mentioned for these parts is effective for excluding air, and this arrangement for a threaded connection is a matter of importance for operation and is convenient in use.

Numeral 13 indicates an annular ridge which projects downwardly from the base near its circular edge, this ridge being of advantage so that the device may be suitably supported and that the receptacle may be maintained in a vertical position.

It will be noted that the base 8 is of greater diameter than the diameter of the pan 9, the object being to provide such a construction that the device will not become overturned by accident or ordinary use, the pan 9 being formed by an annular ridge 14 which projects upwardly from the base 8. However, I do not wish to be understood as limiting myself to this particular construction, and the pan 9 may have any required area.

I claim as my invention,—

An improved fumigating device comprising a wide pan open to the atmosphere throughout and having an upwardly pressed ridge at its outer margin, lugs extending in annular spaced relation about the central part of the pan, a threaded and perforated socket carried upon said lugs above the bottom of the pan, a receptacle for liquid having a threaded neck screwed into the socket, a base member extending out from the ridge wall of the pan, and a downwardly projecting portion extending angularly about the outer rim of said base portion.

In testimony whereof I have affixed my signature.

HARRY A. SEARLE.